United States Patent
Pregizer et al.

(10) Patent No.: US 11,308,821 B2
(45) Date of Patent: Apr. 19, 2022

(54) METHOD AND DEVICE FOR ANALYSIS OF MOVEMENT OF A PIECE OF SPORTS EQUIPMENT

(71) Applicant: VIEWLICITY GMBH, Hamburg (DE)

(72) Inventors: Christoph Pregizer, Hamburg (DE); Lukas Posniak, Hamburg (DE)

(73) Assignee: VIEWLICITY GMBH, Hamburg (DE)

( * ) Notice: Subject to any disclaimer, the term of this patent is extended or adjusted under 35 U.S.C. 154(b) by 15 days.

(21) Appl. No.: 16/062,786

(22) PCT Filed: Dec. 19, 2016

(86) PCT No.: PCT/EP2016/081751
§ 371 (c)(1),
(2) Date: Jun. 15, 2018

(87) PCT Pub. No.: WO2017/103270
PCT Pub. Date: Jun. 22, 2017

(65) Prior Publication Data
US 2020/0013312 A1    Jan. 9, 2020

(30) Foreign Application Priority Data
Dec. 17, 2015  (DE) .................. 10 2015 225 776

(51) Int. Cl.
*G09B 19/00* (2006.01)
*A63B 24/00* (2006.01)
(Continued)

(52) U.S. Cl.
CPC ...... *G09B 19/0038* (2013.01); *A63B 24/0021* (2013.01); *A63B 69/3667* (2013.01);
(Continued)

(58) Field of Classification Search
CPC ............ G09B 19/0038; A63B 71/0622; A63B 69/3667; A63B 24/0021; A63B 2220/806;
(Continued)

(56) References Cited

U.S. PATENT DOCUMENTS 6,625,299 B1  9/2003  Meisner et al.
6,774,349 B2  8/2004  Vock et al.
(Continued)

FOREIGN PATENT DOCUMENTS

CN  103442773  12/2013
CN  103830894  6/2014
(Continued)

OTHER PUBLICATIONS

Extended Search Report for European Patent Application No. 16819892.7, dated Jun. 17, 2019, 7 pages.
(Continued)

*Primary Examiner* — Jeffrey S Vanderveen
(74) *Attorney, Agent, or Firm* — Sheridan Ross P.C.

(57) ABSTRACT

The invention relates to a method for the analysis of movement of a piece of sports equipment of a type of ball sport, in particular a racket, preferably a golf club, or a ball, preferably a golf ball, wherein a first virtual trajectory model is reproduced in a display device in a way that said first virtual trajectory model is displayed as a first line on the display device in superimposition with at least one, in particular in reality, visible section of the environment, particularly when a field of view is directed on the at least one section of the environment which is visible in reality.

9 Claims, 11 Drawing Sheets

Figure 1:
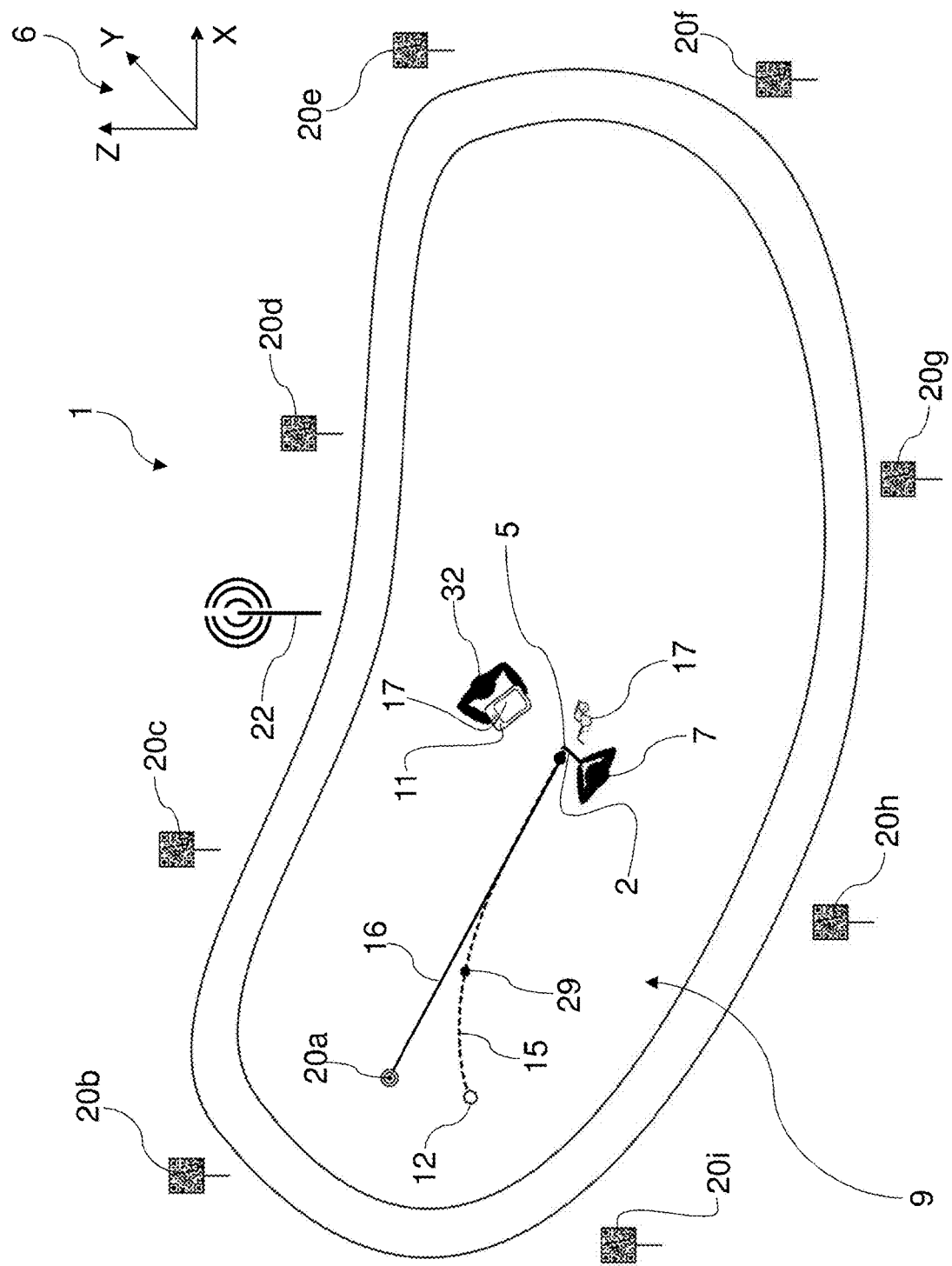

(51) Int. Cl.
*A63B 69/36* (2006.01)
*A63B 71/06* (2006.01)
*A63B 102/32* (2015.01)

(52) U.S. Cl.
CPC .. *A63B 71/0622* (2013.01); *A63B 2024/0031* (2013.01); *A63B 2024/0034* (2013.01); *A63B 2071/0666* (2013.01); *A63B 2071/0694* (2013.01); *A63B 2102/32* (2015.10); *A63B 2220/18* (2013.01); *A63B 2220/806* (2013.01)

(58) Field of Classification Search
CPC ........ A63B 2220/18; A63B 2071/0694; A63B 2071/0666; A63B 2024/0034; A63B 2024/0031; A63B 2102/32; A63B 69/3608; A63B 69/36; A63B 69/3676; A63B 2220/40; A63B 24/0087; Y10S 482/902
See application file for complete search history.

(56) References Cited

U.S. PATENT DOCUMENTS

| | | | |
|---|---|---|---|
| 8,757,625 | B2 | 6/2014 | Sweeney |
| 2002/0173365 | A1* | 11/2002 | Boscha ............... A63B 69/3617 473/131 |
| 2010/0081520 | A1* | 4/2010 | Peterson ............ A63B 69/3676 473/409 |
| 2011/0299729 | A1* | 12/2011 | Dawe ................. A63B 24/0003 382/103 |
| 2015/0343292 | A1 | 12/2015 | Leech |

FOREIGN PATENT DOCUMENTS

| | | |
|---|---|---|
| DE | 68919372 | 3/1995 |
| EP | 1727602 | 6/2011 |
| GB | 2408805 | 6/2005 |
| WO | WO 2014/097579 | 6/2014 |
| WO | WO 2016/057971 | 4/2016 |

OTHER PUBLICATIONS

Translation of the International Preliminary Report for International (PCT) Patent Application No. PCT/EP2016/081751, dated Jun. 28, 2018, 7 pages.

International Search Report prepared by the European Patent Office dated Mar. 3, 2017, for International Application No. PCT/EP2016/081751.

Search Report for German Patent Application No. 102015225776.2, dated Oct. 24, 2016, 9 pages.

Official Action with English Translation for China Patent Application No. 201680074614.1, dated Mar. 26, 2020, 25 pages.

Official Action with English Translation for China Patent Application No. 201680074614.1, dated Dec. 24, 2020, 16 pages.

Official Action with English Translation for Japan Patent Application No. 2018-551503, dated Jan. 4, 2021, 11 pages.

Official Action with English Translation for Japan Patent Application No. 2018-551503, dated Jul. 12, 2021, 6 pages.

* cited by examiner

METHOD AND DEVICE FOR ANALYSIS OF MOVEMENT OF A PIECE OF SPORTS EQUIPMENT

CROSS REFERENCE TO RELATED APPLICATIONS

This application is a national stage application under 35 U.S.C. 371 and claims the benefit of PCT Application No. PCT/EP2016/081751 having an international filing date of 19 Dec. 2016, which designated the United States, which PCT application claimed the benefit of German Patent Application No. 10 2015 225 776.2 filed 17 Dec. 2015, the disclosure of each of which are incorporated herein by reference.

The invention relates to a method and an apparatus for analyzing the movement of a piece of sports equipment for a type of ball sport, in particular a racket, preferably a golf club, or a ball, preferably a golf ball.

Although the invention can be used in a plurality of different types of sport to analyze sequences of motion, it is particularly suitable as a training aid in terms of golf due to the complexity of the associated motion sequences in golf. Particularly the act of putting demands a great deal of fine motor control from the golfer, which is why it is particularly well-suited to illustrate the invention and will be drawn on in the following as an example of a motion sequence to be analyzed.

During putting training, the primary focus is normally on stroke technique, thus the motoric aspects of the movement and statistically evaluating same. Due to the speed of execution and high requirements for precision, it is virtually impossible to detect the motion dynamics occurring during putting with the naked eye. Even with traditional methods of analysis such as bioanalysis using a video recording of the golfer during putting, methodical reasons preclude the dynamic aspects of the putting stroke from being sufficiently or even easily analyzed.

Accordingly, putting training is often highly neglected or leads to unsatisfactory results, even though, based on the number of strokes during an average round of golf, putting accounts for somewhat more than 40% of golfing.

When learning slower movements like putting, poor systematic motion techniques are often also learned right alongside unnoticed. Fast ballistic movements are always executed as a pure motoric function and are thus self-organizing. In contrast, slower movements always have strong ties to strategy. Individual golfers are often unaware of any poor strategic motion techniques they may have incorporated during slower movements like putting and even coaches have difficulty spotting them with the naked eye. Paradoxically, these poor strategic motion techniques can continually worsen with increased practice.

It is further known that using training aids can have a positive effect on learning a motion sequence, see hereto Master PGA professional golfer Birgitt Hilsebusch's master thesis on "The use of training aids to sensitize haptic perception in beginner golf lessons."

US 2010/0081520 A1 relates to systems and methods for providing putting information to a golfer. Such putting information can encompass an optimal ball trajectory including the initial target point at which the ball should be struck and the optimal force with which the ball should be struck.

U.S. Pat. No. 8,757,625 B2 discloses a method for calculating and displaying a trajectory of a ball and an aim point mark for aiming a putted golf ball from a starting point on a golf course to a target point based on precalculated putting data for the putting green. The aim point mark is graphically displayed on a visual representation of the putting green at an aim point distance perpendicular to the left or right of the target location, whereby the aim point distance indicates a location on the putting green for properly aiming a putt in order to propel a golf ball from a start position to a desired target location.

EP 1 727 602 B1 relates to a motion analysis method for determining the position and/or the orientation of a golf club, wherein the movement of a golf club upon hitting a ball is detected and analyzed by means of a position sensor mounted on a golf club, a position signal transmitted between the position sensor mounted on the golf club and a stationary control unit, and the position and/or orientation of the golf club determined as a function of the position signal.

GB 2 408 805 B relates to an electromagnetic tracking system which uses a wireless transmitter.

U.S. Pat. No. 6,625,299 B1 relates to a tracking system for determining the relative position between a sensor and an object surface which comprises a sensor for detecting a pattern of markers on the object surface.

US 2015/0343292 A1 relates to a golf aid for communicating golf-related information by means of a head-up display.

It is a task of the present invention to provide as a training aid an improved method and an improved apparatus for analyzing the movement of a piece of sports equipment. In particular a task of the invention is providing a user with simultaneous feedback on the movement of the sports equipment.

This task is solved by methods according to the present disclosure as well as by systems according to the present disclosure and claims herein. Advantageous embodiments are described in the present disclosure and in some claims.

A first aspect of the invention relates to a method for analyzing the movement of a piece of sports equipment for a type of ball sport, in particular a racket, preferably a golf club, or a ball, preferably a golf ball, which preferably comprises the following procedural steps:

Detecting a start position of a ball of the ball sport type, in particular a tee-off position, in a reference system;

Detecting a defined target position for the ball, in particular a golf hole, in the reference system;

Detecting at least one environmental parameter in the reference system, in particular a topographical parameter, which at least partially characterizes an environment, in particular a playing field, within an area between the start position and the target position;

Utilizing the reference system in calculating an ideal trajectory for the sports equipment based on the starting position of the ball, the target position of the ball and the at least one environmental parameter;

Generating a first virtual trajectory model of the piece of sports equipment in at least one section of the environment on the basis of the ideal trajectory of the piece of sports equipment;

Detecting a position and/or an orientation, in particular continuously, of a display device, in particular a head-mounted display, in the reference system;

Calculating a field of view through the display device in the reference system; and Reproducing the first virtual trajectory model in the display device such that the first virtual trajectory model displays as a first line in the display device in superimposition with at least one part of the section of the environment, which is in particular visible in reality, when the field of view is directed toward the at least one section of the environment visible in reality.

A second aspect of the invention likewise relates to a method for analyzing the movement of a piece of sports equipment for a type of ball sport, in particular a racket, preferably a golf club, or a ball, preferably a golf ball, which preferably comprises the following procedural steps:

Detecting a start position of a ball of the ball sport type, in particular a tee-off position, in a reference system;

Detecting a defined target position for the ball, in particular a golf hole, in the reference system;

Detecting at least one environmental parameter in the reference system, in particular a topographical parameter, which at least partially characterizes an environment, in particular a playing field, within an area between the start position and the target position;

Utilizing the reference system in calculating an ideal trajectory for the sports equipment based on the starting position of the ball, the target position of the ball and the at least one environmental parameter;

Generating a first virtual trajectory model of the piece of sports equipment in at least one section of the environment on the basis of the ideal trajectory of the piece of sports equipment; and Reproducing the first virtual trajectory model in the display device such that it projects into the environment as a first line.

A third aspect of the invention relates to a system for analyzing the movement of a piece of sports equipment for a type of ball sport, in particular a racket, preferably a golf club, or a ball, preferably a golf ball, which comprises an image display device, in particular a head-mounted display, arranged to generate an augmented reality, and a tracking module, arranged to detect a start position of a ball of the type of ball sport and a defined target position for the ball, in particular a golf hole, in the reference system and to detect a position and/or orientation of the head-mounted display in the reference system. The system furthermore preferably comprises a data interface or a scanning apparatus arranged to detect at least one environmental parameter in the reference system, in particular a topographical parameter, which at least partially characterizes an environment, in particular a playing field, within an area between the start position and the target position. The system furthermore preferably comprises a processing unit arranged to utilize the reference system in calculating an ideal trajectory for the piece of sports equipment based on the start position of the ball, the target position of the ball and the at least one environmental parameter, and to generate a first virtual trajectory model of the piece of sports equipment in at least one section of the environment on the basis of the ideal trajectory of the piece of sports equipment and to calculate a field of view through the display device in the reference system. The display device is thereby preferably configured so as to display the first virtual trajectory model as a first line in superimposition with at least one part of the section of the environment, particularly one which is visible in reality, in particular when the field of view is directed toward the at least one part of the section of the environment.

A fourth aspect of the invention relates to a system for analyzing the movement of a piece of sports equipment for a type of ball sport, in particular a racket, preferably a golf club, or a ball, preferably a golf ball, which comprises a user interface arranged to detect a start position of a ball of the type of ball sport in a reference system, in particular by user input. The system furthermore comprises a projector arranged to generate projections of at least one playing field and a data interface or scanning apparatus arranged to detect in the reference system the position of the projector, a defined target position for the ball, in particular a golf hole, and at least one environmental parameter, in particular a topographical parameter, which at least partially characterizes the playing field within an area between the start position and the target position. Further preferably, the system comprises a processing unit arranged to utilize the reference system in calculating an ideal trajectory for the piece of sports equipment based on the start position of the ball, the target position of the ball and the at least one environmental parameter, and to generate a first virtual trajectory model of the piece of sports equipment and at least one section of the environment on the basis of the ideal trajectory of the ball. The projector is moreover preferably arranged to project the start position of the ball and the first virtual trajectory model onto the playing field as a first line.

The following will describe advantageous method embodiments of the first and second aspect of the invention which, unless expressly excluded, can each be combined with one another.

Detection in the sense of the invention is an importing of data in the broadest sense. This encompasses both importing via a data interface of a data processing system, thus data which already exists and any buffered data there might be, as well as also a measuring and/or receiving of information converted into relevant data, for example by means of a scanning apparatus, in particular a 3D scanner, or a tracking module enabling optical identification of information. Detection in particular also means the furnishing of data, for example when data stored in a memory storage device is accessed in a system.

An environmental parameter in the sense of the invention is a parameter which characterizes the surroundings or environment respectively. In particular, an environmental parameter can be a topographical parameter which characterizes the topography of an environment. Further non-limiting examples of environmental parameters are wind or respectively air flow, dew, water, water flow, centrifugal/centripetal forces, green speed, weather, etc. Environment parameter values can in particular be provided to the inventive system and method as importable datasets. Preferably, the inventive system and method can independently detect, in particular measure or identify, values of an environmental parameter.

Topographical parameter values preferably form a data matrix in which a value is stored for each position. Further preferably, the values of a topography parameter form a so-called 3D grid.

Calculation in the sense of the invention is a deriving of information from gathered information and, where applicable, further information or boundary conditions, in particular an evaluating of information.

A display device in the sense of the invention serves in visually reproducing information.

As defined by the invention, virtual means not real, not actually existing in reality.

As defined by the invention, real means actually existing, in particular physically.

A user interface in the sense of the invention is any type of interface enabling user communication or respectively interaction with a data processing system. Preferably, a user interface is a touch-sensitive screen, a mouse, a keyboard, a touchpad, a gesture control device, in particular gestures made when using sports equipment, etc.

A data interface in the sense of the invention serves in detecting/importing data into a data processing system.

A scanning apparatus in the sense of the invention is a device that scans an object or an environment for analysis, in particular by means of image processing, laser or electron beam, and stores and preferably processes the measured values received.

A processing unit in the sense of the invention is any type of data processing device which in particular comprises a memory and a processor.

A tracking module in the sense of the invention is a module which measures a position, an orientation and/or a distance of an object from a reference point. Measurements can thereby be made by means of optical, radio, ultrasonic, infrared or other similar measurement techniques. The tracking module is designed as hardware or as software of an existing data processing system.

The invention is in particular based on the approach of it being difficult or even impossible for a player, when controlling a ball or respectively when a ball is in motion, to assess by way of visual perception whether his ball control results in or will result in a desired movement of the ball and what deviation from its ideal path (trajectory) a ball will take during its motion.

In particular, it is not possible for a beginner to recognize poorly executed motions from intrinsic visual feedback of the trajectory of a piece of sports equipment based on his own visual sensomotoric information since a beginner cannot identify the ideal movement of the sports equipment as that movement is part of proper motion techniques not yet learned.

The invention therefore encompasses the technical teaching of calculating an ideal ball trajectory based on data of a start ball position, a target ball position and the environment and using that as applicable to calculate an ideal club trajectory.

This ideal movement by a player or user superimposed on the ideal movement of the ball and/or club is represented in such a way that the player/user can observe the ideal movement and the actual movement from his playing position.

Such an extrinsic augmented visual feedback offers additional motion analysis information and helps beginners and experienced players alike improve their perception of the movement of the sports equipment by relating it to their own intrinsic feedback; i.e. their own sensory information. Extrinsic feedback hereby designates supplementary external information as can be communicated from the outside to a player by aids, particularly by means of visual information. Preferably, haptic feedback can furthermore be provided.

In particular, knowledge related to the sequence of movement taken by the sports equipment can be obtained with the invention, which is useful in practical training. In particular, the invention enables simultaneous feedback to be provided at the same time the movement is being executed by reproducing the ideal trajectory of the ball and/or club synchronously to the actual movement of the ball and/or club in reality.

Existing extrinsic feedback systems, such as video analysis, are unable to accomplish this since although the player can subsequently view an actual movement of the ball and/or club in terms of his own movement, he can longer establish a frame of reference to his perceptions while executing the movement. Thus, it is precisely an improvement of intrinsic feedback for beginners which is not possible with the prior art systems.

In one advantageous embodiment of the inventive method according to the first aspect of the invention, same further preferably comprises the following procedural steps:

Detecting a position and/or an orientation of the piece of sports equipment in the reference system at least during one period of time during which the sports equipment is in motion;

Generating a second virtual trajectory model of the piece of sports equipment in at least one section of the environment on the basis of an actual trajectory of the piece of sports equipment; and Reproducing the second virtual trajectory model in the display device such that the second virtual trajectory model displays as a second line in the display device in superimposition with the at least one part of the section of the environment of the first line, in particular when the field of view is directed toward the at least one section of the environment visible in reality.

In one advantageous embodiment of the inventive method according to the second aspect of the invention, same further preferably comprises the following procedural steps:

Detecting a position and/or an orientation of the piece of sports equipment in the reference system at least during one period of time during which the sports equipment is in motion:

Generating a second virtual trajectory model of the piece of sports equipment in at least one section of the environment on the basis of an actual trajectory of the piece of sports equipment; and Reproducing the second virtual trajectory model as a second line in the environment.

These advantageous embodiments enable not only illustrating the ideal trajectory in relation to the actual position of the club to the user but also an actual trajectory of the ball or the club. The user/player can therefore notice deviations over the entire sequence of motion of the piece of sports equipment.

In one advantageous embodiment of the inventive method according to the second aspect of the invention, the projector's orientation is additionally taken into account during the generating of the first and/or second virtual trajectory model, whereby to determine the orientation of the projector, an actual position of the at least one object with a known position is aligned with the projected position of the at least one object and/or an actual position of the at least one object is detected and aligned with a position in the reference system.

In one advantageous embodiment of the inventive method according to the second aspect of the invention, at least one intrinsic projector parameter, in particular a projection matrix of the projector (8), is additionally factored in when generating the first and/or second virtual trajectory model.

In a further advantageous embodiment of the method according to the invention, the ideal trajectory of the ball is used to calculate the ideal trajectory of a club.

In a further advantageous embodiment of the method according to the invention, the first trajectory model represents the ideal ball trajectory and/or a theoretical trajectory in a flat topography having the starting direction of the ideal trajectory. In particular, the theoretical trajectory enables conveying to a user/player, particularly in golf, how a ball would ideally be hit without any complications from the topography of the putting greens or golf course respectively. The user/player can more easily internalize this information as an estimation of the club movement to execute.

In a further advantageous embodiment, the inventive method preferably further comprises the procedural step of utilizing the reference system in calculating a first virtual chronological sequence of a position of the sports equipment in the first virtual trajectory model as a function of the start position, the target position and the at least one environmental parameter, whereby the first virtual chronological sequence of the position of the sports equipment is displayed when the first virtual trajectory model is reproduced.

In a further advantageous embodiment, the inventive method preferably further comprises the procedural step of calculating a second virtual chronological sequence of a position of the sports equipment in the second virtual trajectory model as a function of the actual trajectory of the sports equipment, whereby the second virtual chronological sequence of the position of the sports equipment is displayed when the second virtual trajectory model is reproduced. Displaying the position taken by the sports equipment over time, in particular the chronological sequence of the ideal trajectory compared to the actual position of the ball, gives the player/user further important information on the quality of his ball control. In particular, the user/player receives information on the strength of his swing as well as any applicable spin effects and/or the division into the path in flight and the path when rolling.

Preferably, a display of the chronological sequence of the ideal trajectory is repeated periodically. This allows a user to fix a movement of the sports equipment in his mind. When realizing the method, it can in particular thereby be provided to individualize game pace to the user. It can additionally or alternatively be provided for the chronological sequence to be underscored by audio output.

In a further advantageous embodiment of the inventive method, the first virtual chronological sequence is synchronized to the actual course and/or the second virtual chronological sequence relative to a ball impact point. This synchronization to impact point enables establishing a direct comparison between the ideal chronological sequence of a ball and the actual chronological sequence of a ball.

Differences in the foregoing club movement, for example in the backswing or downswing of the club, can therefore be disregarded.

In a further advantageous embodiment of the inventive method, the displaying of the first virtual chronological sequence and/or a second virtual chronological sequence is implemented by a forming of the first or second line respectively and/or by a characterization, in particular a schematic illustration of the sports equipment.

In a further advantageous embodiment of the inventive method, a defined player position is additionally indicated in the reproduction, in particular at least one third line. This standing position enables establishing the prerequisite for good club movement, and thus also good ball movement, in particular in inexperienced beginners, particularly in golf. In particular, the defined standing position depends on the height of the player and/or the type and/or length of the club.

In a further advantageous embodiment of the inventive method, the method is in each case realized, particularly in parallel, for the club as the first piece of sports equipment and the ball as the second piece of sports equipment. This thereby enables analyzing the movement of the ball and of the club during a single ball control action.

In a further advantageous embodiment of the inventive method, the first virtual trajectory model and/or second virtual trajectory model of a club additionally takes an orientation of the club into consideration.

In a further advantageous embodiment of the inventive method, a deviation in the position and/or orientation of the club from the ideal trajectory is depicted during the reproduction, in particular prior to the point of impact, in particular by means of an arrow.

This advantageous embodiment enables not only the timing of the club movement but also the orientation of the club during the club movement to be analyzed.

In a further advantageous embodiment, the inventive method further comprises the following procedural steps:

Detecting a position and/or orientation of the piece of sports equipment in the reference system at least during one period of time during a movement of the sports equipment;

Logging an actual trajectory of the piece of sports equipment on the basis of the data collected; and Comparing an actual trajectory to the calculated trajectory;

wherein the first and/or second virtual trajectory model additionally depends on the degree of concurrence between the actual trajectory and the calculated trajectory as determined in the comparison.

A structural problem or respectively mistake made by the player can thereby be offset in such a way that the player ultimately performs the desired movement.

In a further advantageous embodiment, the inventive method further comprises the following procedural steps:

Detecting a position and/or orientation of the piece of sports equipment in the reference system at least during one period of time during a movement of the sports equipment;

Logging an actual trajectory of the piece of sports equipment on the basis of the data collected; and Comparing an actual trajectory to the calculated trajectory; and Adapting a training method based on the degree of concurrence between the actual trajectory and the calculated trajectory as determined in the comparison.

As defined by the invention, a training method is a specifying of a defined training environment and/or a predefined sequence of training exercises.

Player error and/or mistakes when executing movement of the sports equipment can be specifically trained out of the player by way of this advantageous embodiment.

In a further advantageous embodiment of the inventive method, the at least one environmental parameter is metrologically recorded by means of a scanning apparatus, in particular by means of a sensor, preferably by means of a camera of a head-mounted display, and/or determined from another metrologically recorded parameter.

Preferably, a tracking module and/or a scanning apparatus of the head-mounted display visually captures an environment, with the environmental parameter, in particular the topographical parameter, being determined therefrom.

In a further advantageous embodiment of the inventive method, the at least one environmental parameter, in particular the topographical parameter, is corrected on the basis of a position determination of a single object, in particular the ball, from two different perspectives, at least in the surroundings of the object.

This enables correcting for errors which occur when calculating the environment on the basis of fewer measuring points.

In a further advantageous embodiment, the inventive method further comprises the following procedural steps:

Detecting a position of the ball in the reference system at least during one period of time during a movement of the ball;

Logging an actual trajectory of the ball on the basis of the data collected; and Correcting the at least one environmental parameter based on the actual trajectory.

This thereby enables the identifying or respectively determining of at least one environmental parameter and/or the continuous improving of the quality of the environmental parameter.

In a further advantageous embodiment, the inventive method according to the first aspect of the invention comprises the following procedural steps:

Filming the field of view; and

Reproducing the visible part of the section of the environment as filmed.

This is then in particular of advantage when the first virtual trajectory model and the currently visible part of the section of the environment are to be displayed on a single screen of a display device such as, for example, on a tablet computer.

The methods of the first and second aspect of the invention and their advantageous embodiments of described features and advantages also apply accordingly to the apparatus of the third and fourth aspect of the invention and their advantageous embodiments and vice versa.

In one advantageous embodiment of the system according to the third aspect of the invention, the tracking module executes inside-out tracking starting from the display device and the system preferably further comprises at least one marker arranged to be positioned in the environment as a reference point for the inside-out tracking.

In a further advantageous embodiment of the system according to the third aspect of the invention, the tracking module employs an outside-in tracking method and the system comprises a direction finder arranged to be positioned in the environment. Markers in the environment can be dispensed with in this embodiment.

In a further advantageous embodiment of the system according to the third aspect of the invention, the display device moreover comprises a camera and the tracking module utilizes at least optical tracking.

In one further advantageous embodiment of the system according to the invention, the tracking module is further arranged to determine an actual position of the piece of sports equipment and/or the system further comprises a radiolocation device in order to determine an actual position and/or actual trajectory of the sports equipment, and the projector or the display device is further preferably arranged to display the actual position and/or actual trajectory of the piece of sports equipment.

In a further advantageous embodiment of the inventive system, the display device further comprises at least one accelerometer and one gyrosensor in order to measure movement in six degrees of freedom and whereby the processing unit is further arranged to determine, by means of coupling, the position and/or orientation of the display device based on a position and/or orientation of the display device determined by the tracker.

Figure 2:
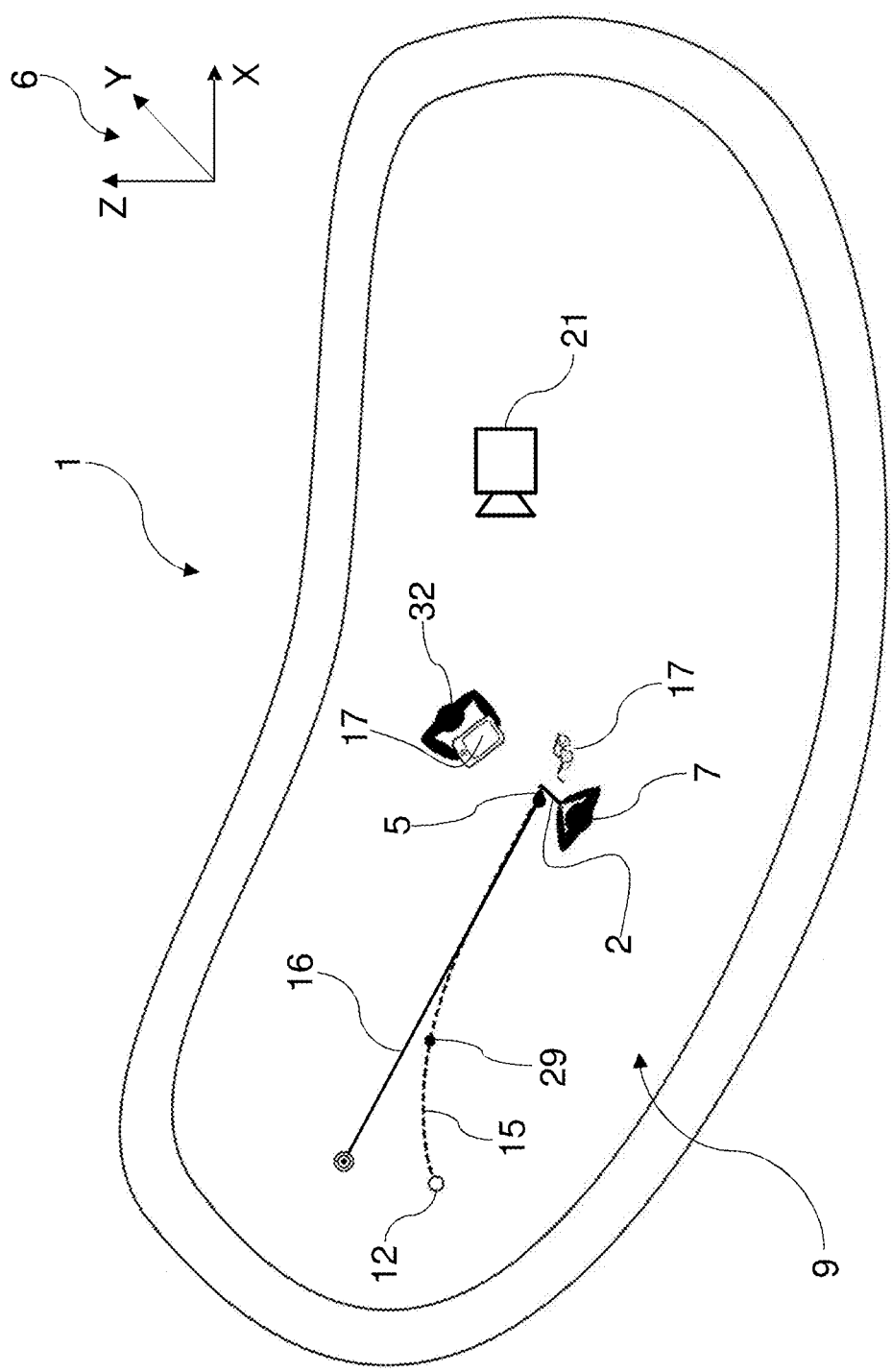
Figure 3:
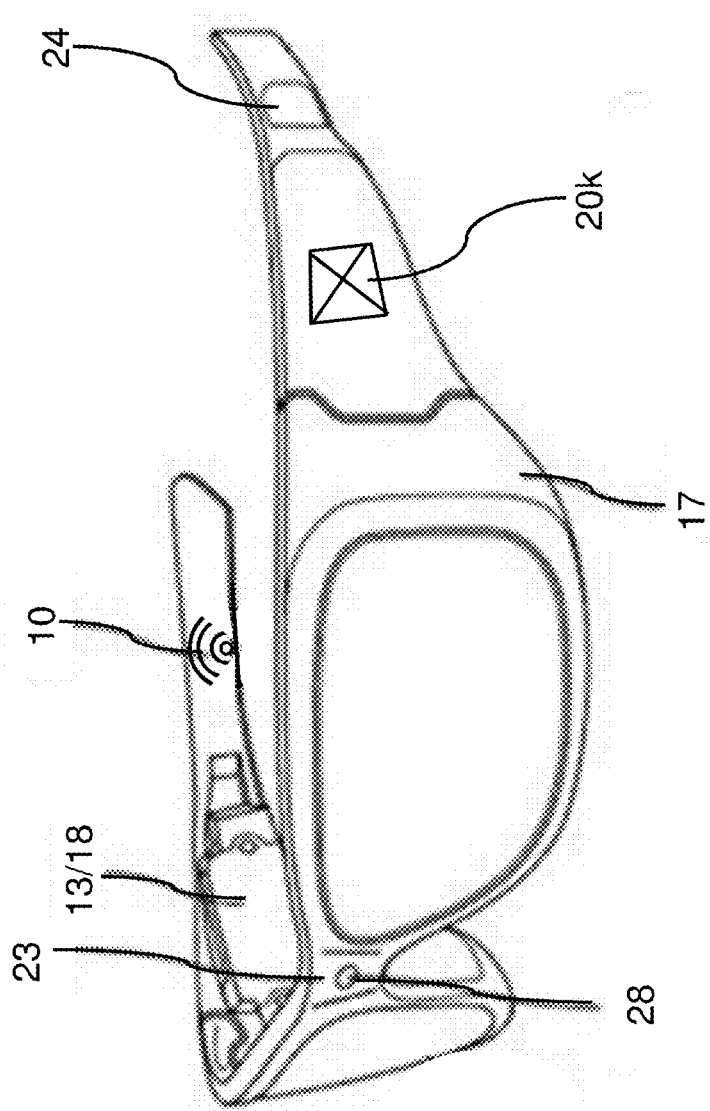
Figure 4:
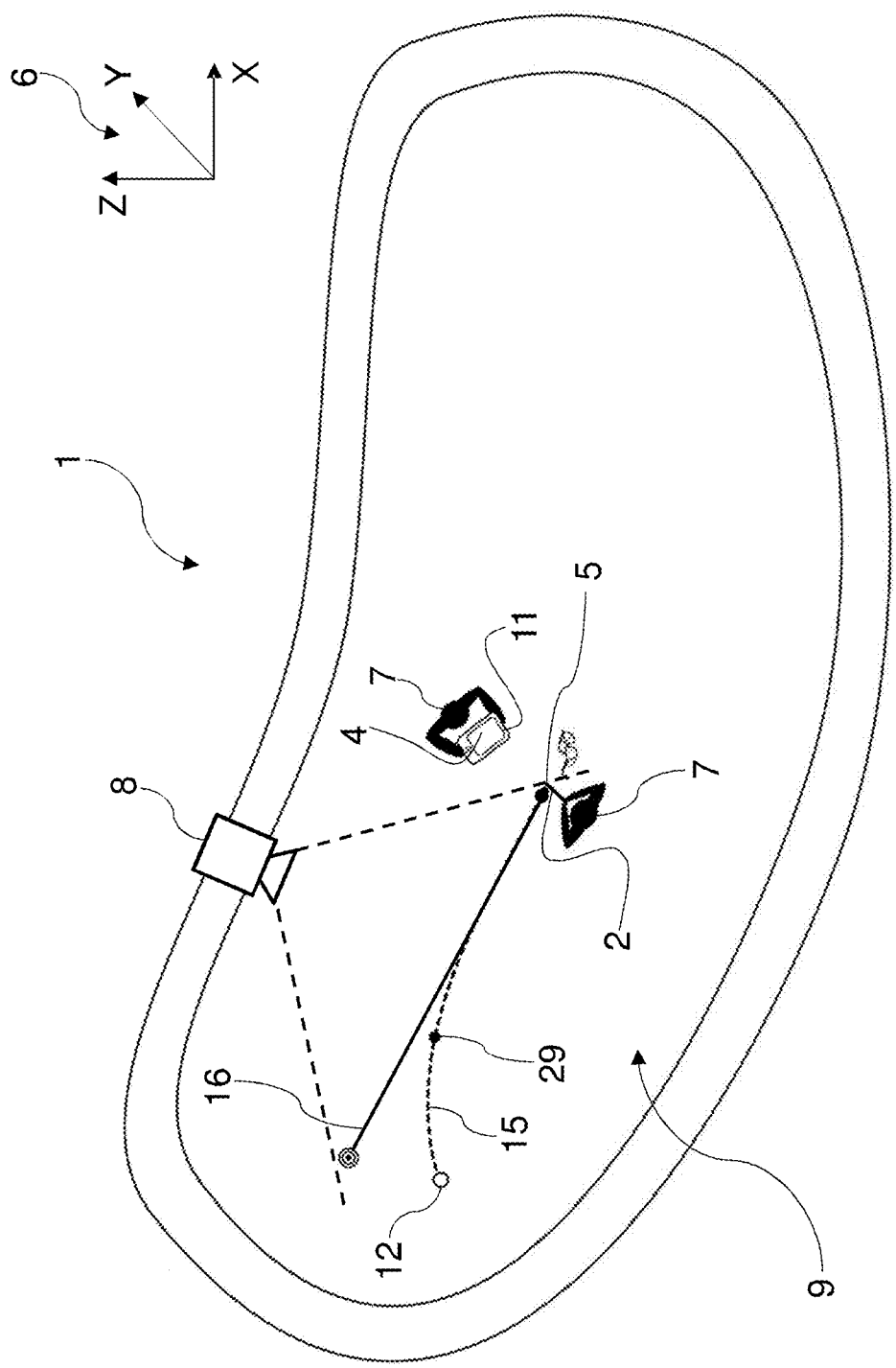
Figure 5:
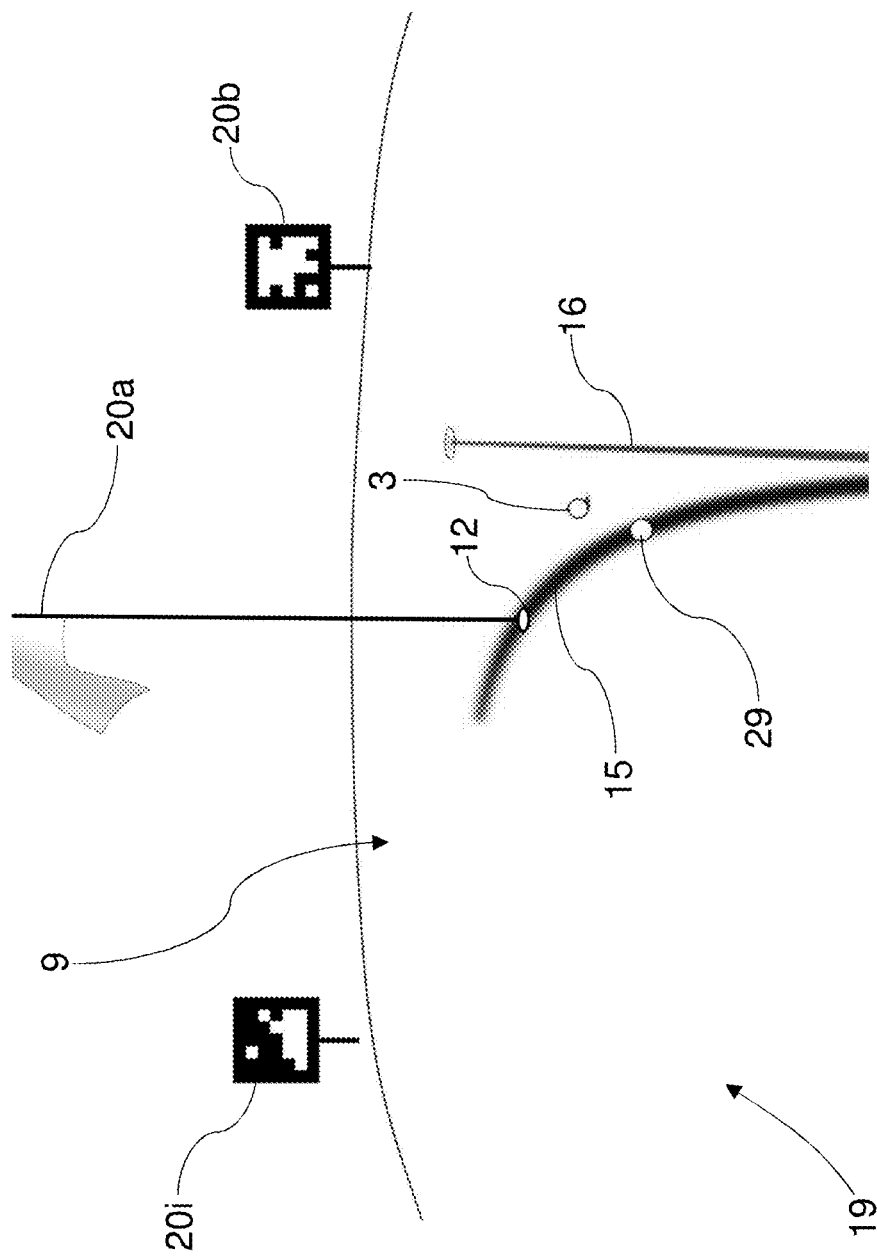
Figure 6:
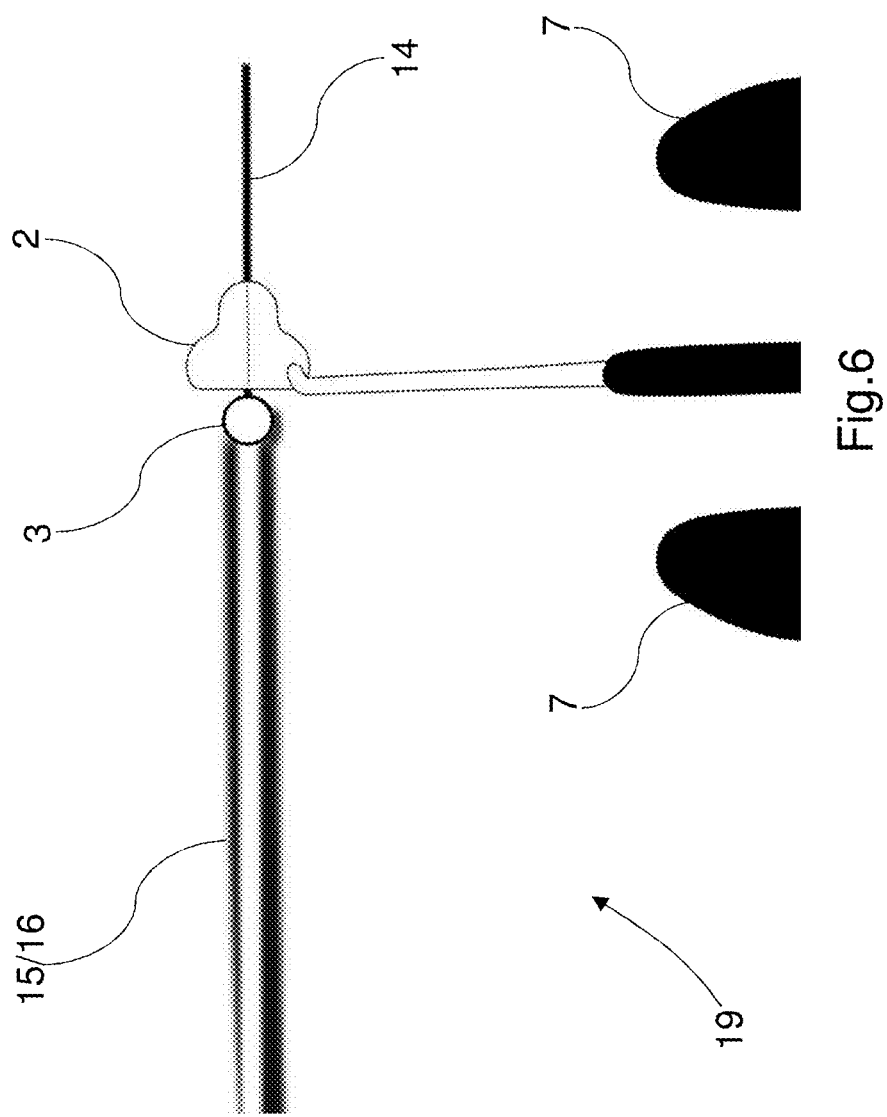
Figure 7:
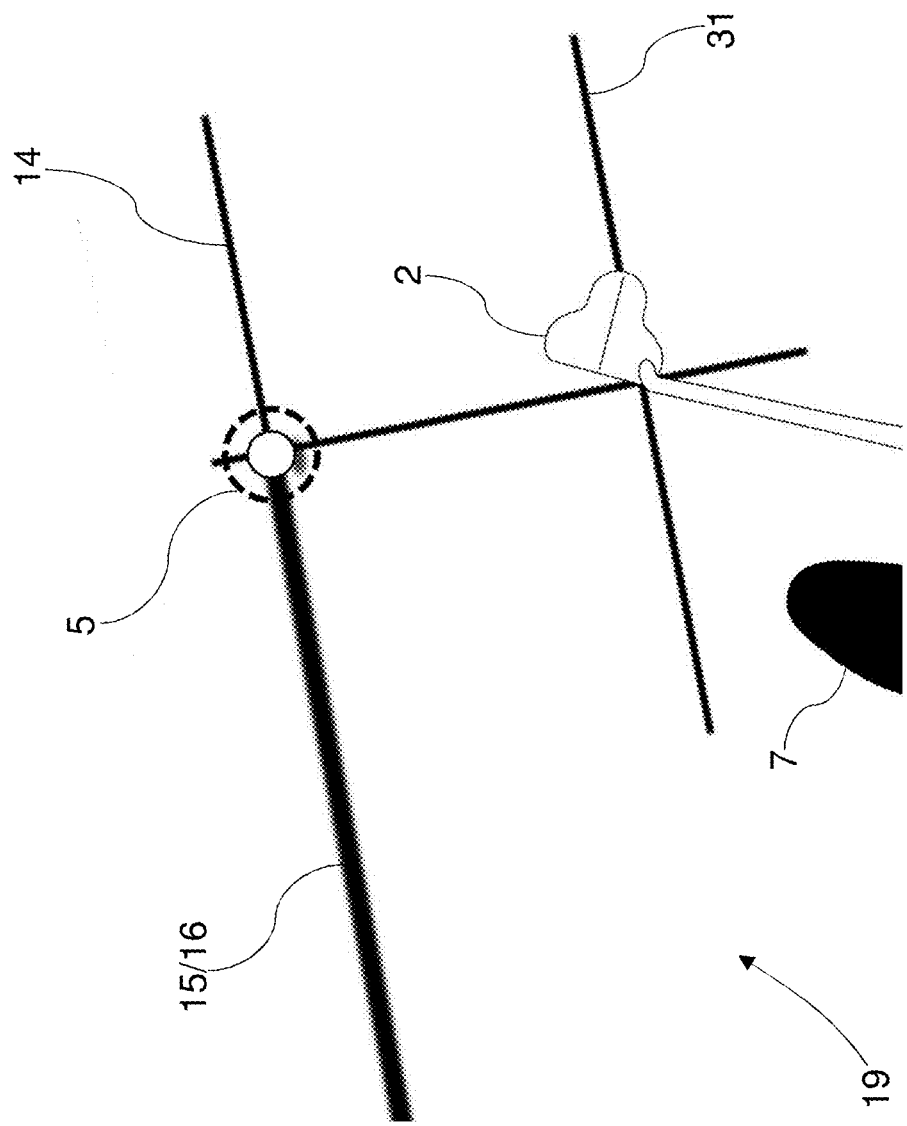
Figure 8:
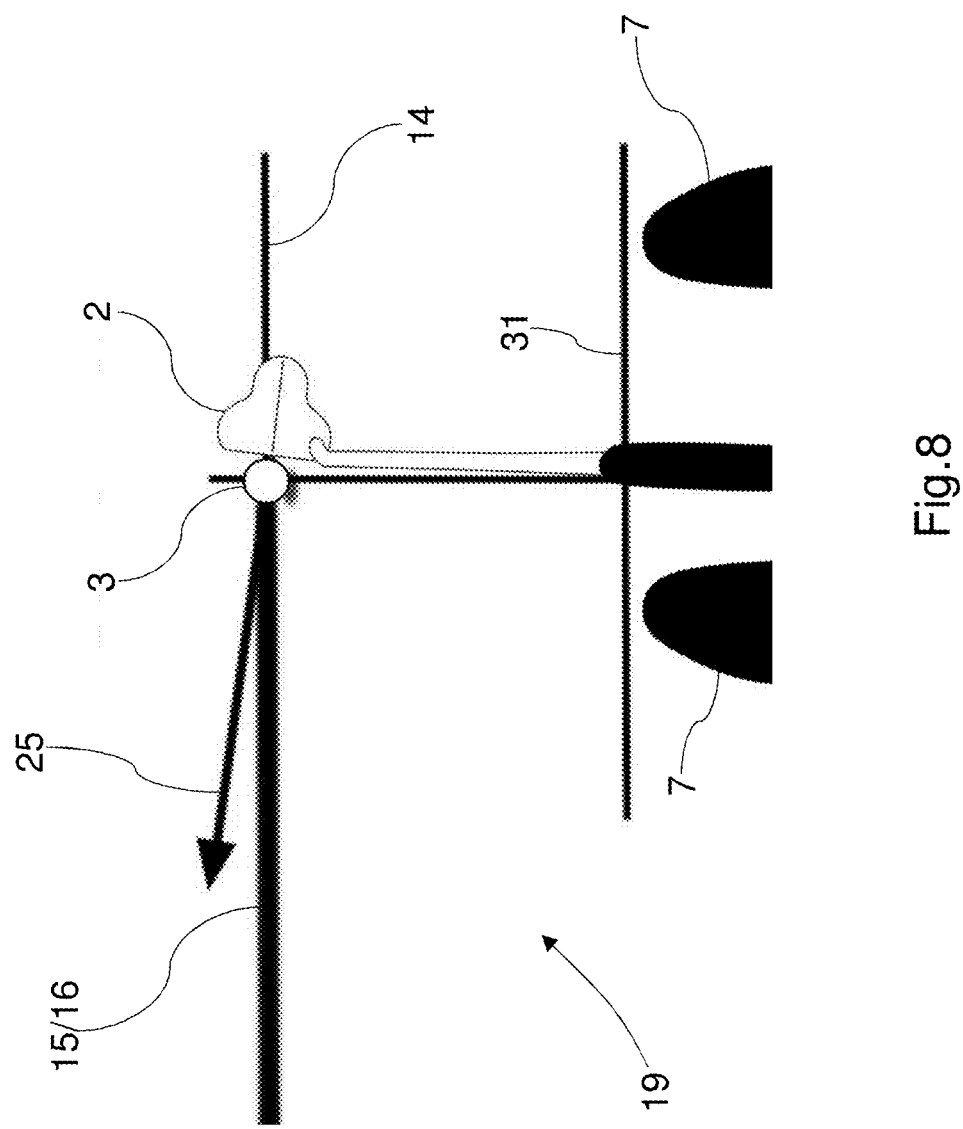
Figure 9:
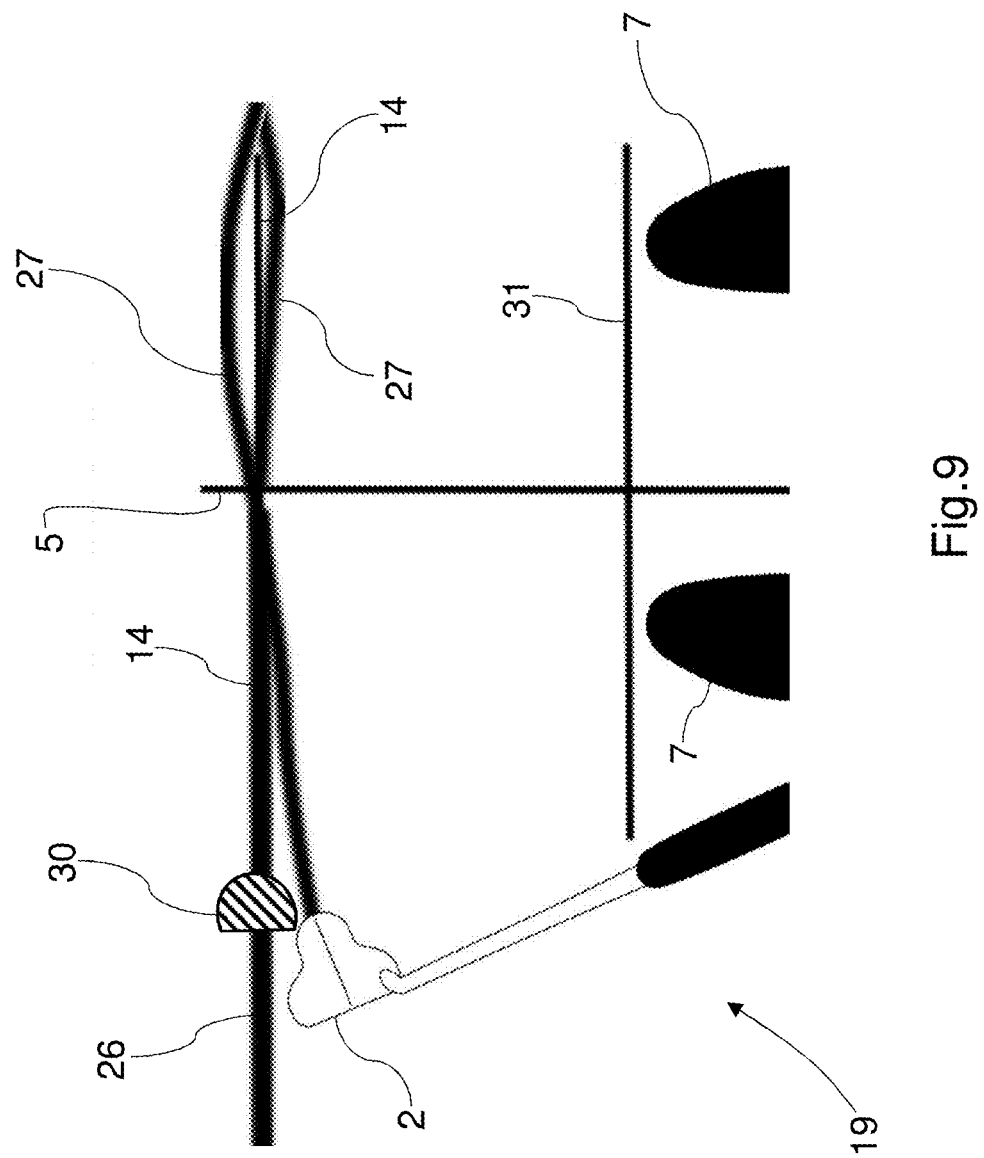
Figure 10:
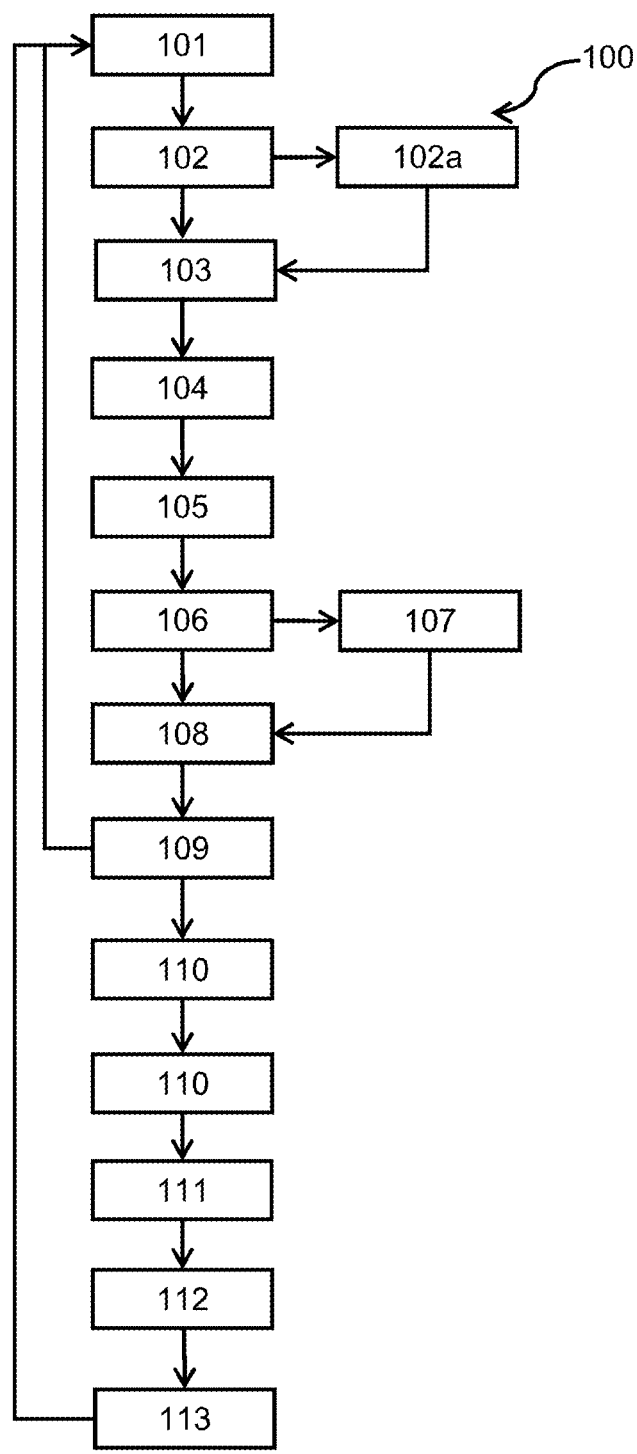
Figure 11:
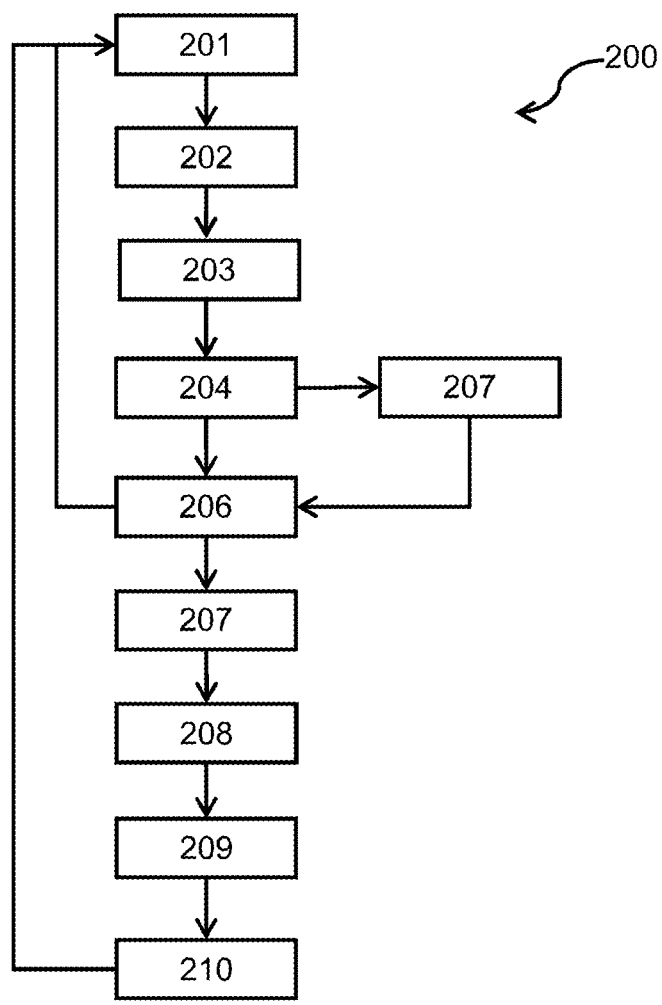

Further features, advantages and possible applications of the invention are yielded by the following description in conjunction with the figures which at least partially show:

FIG. 1 a first embodiment of the system according to the third aspect of the invention;

FIG. 2 a second embodiment of the system according to the fourth aspect of the invention;

FIG. 3 an embodiment of an inventive display device;

FIG. 4 a third embodiment of the system according to the fourth aspect of the invention;

FIG. 5 a depiction of a first possible field of view of a user;

FIG. 6 a depiction of a second possible field of view of a user;

FIG. 7 a depiction of a third possible field of view of a user;

FIG. 8 a further depiction of the second possible user field of view;

FIG. 9 a further depiction of the second possible user field of view;

FIG. 10 a block diagram of a method according to the first aspect of the invention; and FIG. 11 a block diagram of a method according to the second aspect of the invention.

FIG. 1 shows a first embodiment of the system 1 according to the third aspect of the invention.

The following will explain the inventive system 1 and the inventive method 100, 200 using golf as the type of ball sport. This is not, however, limiting and the invention can also be used in other types of ball sports with or without racquets.

The system 1 comprises a head-mounted display 17, in the present case a pair of data glasses, as well as a marker 20a for a target position 12, in the present case a golf hole. A golf ball 5, struck with a golf club 3 by a user 7, in this case a golfer, is to reach the golf hole 12.

The system 1 further comprises markers 20b, 20c, 20d, 20e, 20f, 20g, 20h, 20i arranged around a playing field 9 forming the environment, in the present case a putting green.

The data glasses 17 are worn by the user 7 (even if this is shown differently in FIG. 1 for illustrative reasons). One embodiment of said data glasses 17 is shown in FIG. 3. Apart from the elements typical to a pair of eyeglasses, these glasses comprise a processing unit 13 with a tracking module 18. The data glasses 17 moreover comprise a camera 28, an accelerometer 23, a gyrosensor 24 and a data interface 10, in particular a wireless interface. Tracking methods further explained below are preferably implemented via a tracking module 18 of the processing unit 13. Data can preferably be collected via a data interface 10 of the system 1 or the data glasses 17 respectively.

The first embodiment of the inventive system shown in FIG. 1 employs so-called inside-out tracking. A position and/or an orientation of the data glasses 17 in a reference system 6 is thereby determined continuously 106. The reference system 6 is thereby dictated by system 1. By means of the camera 28, the data glasses 17 distinguish different markers 20a, 20b, 20c, 20d, 20e, 20f, 20g, 20h, 20i depending on orientation and position. The absolute position of these markers is known to the system 1 and entered into the system 1 for example via the data interface 10. For identification purposes, the individual markers 20a, 20b, 20c, 20d, 20e, 20f, 20g, 20h, 20i exhibit a QR code or a similar identification which is recognized by the display device 17 and unambiguously identifies each individual marker 20a, 20b, 20c, 20d, 20e, 20f, 20g, 20h, 20i. Based on the knowledge of which marker is situated in the field of view 19 of the data glasses 17 and the distance to the respective markers 20a, 20b, 20c, 20d, 20e, 20f, 20g, 20h, 20i, which the data glasses 17 can deduce from the size of the respective marker 20a, 20b, 20c, 20d, 20e, 20f, 20g, 20h, 20i or from the size of the respective QR code, the data glasses 17 calculate their absolute position on the putting green 9.

When the absolute position of the data glasses 17, which corresponds to the relative position of the data glasses 17 in relation to the markers 20a, 20b, 20c, 20d, 20e, 20f, 20g, 20h, 20i is determined 101, a field of view 19 (not depicted in FIG. 1) of the display device 17 in the reference system 6 is then preferably calculated 102 in a next step. The field of view 19 hereby in particular corresponds to a sector of the environment which a user 7 can see through the data glasses 17.

Once the absolute position and/or orientation of the data glasses 17 has been determined, the position and/or orientation can then subsequently be determined at least over a specific period of time by the processing unit 13 periodically recalculating a new position and/or a new orientation via an optical tracking method and/or from measurements of an accelerometer 23 and/or a gyrosensor 24. A so-called coupling starting from the original position and/or orientation determined by the tracking module 18 is thereby employed.

Based on the absolute position and orientation of the data glasses 17, this position fixing of objects on the putting green 9 likewise ensues via inside-out tracking. According to the invention, in particular the tee-off position 5 and the hole position 12, which represent the inventive start position and target position, are thereby filmed by the camera 28 and identified in a filmed video sequence by means of known image processing processes. On the basis of the position of the tee 5 and the hole 12 in the video footage and the known position and orientation of the data glasses 17 in the reference system 6, the position of the tee 5 and the hole 12 can also be determined 103, 104. This can occur preferably in parallel in just one procedural step; in reality, however, chronologically successive procedural steps would be necessary thereto since the tee-off position 5 and the hole 12 often cannot be seen simultaneously from the one individual position of the user 7.

Due to the poor recognizability of a golf hole 12 on the putting green 9, particularly from a certain distance, it can be provided for a marker 20a to also be allocated to the hole 12 as depicted in FIG. 1.

The method described in the foregoing for determining the tee-off position 5 or golf hole position 12 respectively can also be used to determine a position and/or orientation of the golf ball 3 (not depicted in FIG. 1) or golf club 2 (not depicted in FIG. 1) 110. In order to be able to better determine the orientation of the golf club 2 in the reference system 6 by means of the optical inside-out tracking method, further markers can be attached to the golf club 2 which facilitate an identifying of the orientation in a video sequence.

Alternatively or additionally to the position fixing by means of an optical tracking method, the position of objects on the putting green 9 can also be determined by means of a radiolocation device 22, which is likewise depicted in FIG. 1. To this end, however, the objects whose positions are to be detected need to be equipped with their own transmitter device or at least with a signal reflector. Position is in particular detected on the basis of measuring the transit time of radio signals 103, 104, 110. Particularly with respect to determining the position of the ball 3 and/or the orientation of the club 2, such a radiolocation by way of a radiolocation device 22 offers the advantage of not all of the objects needing to be visible in order to determine their respective position. Moreover, radiolocation enables better reconstruction of quick object movements, likewise the club 2 and the ball 3 in the present case.

Furthermore, the system 1 is provided with environmental parameters 105, which characterize an environment within the area between the tee 5 and the hole 12.

These are, in the example embodiment shown in FIG. 1, preferably the topography of the putting green 9, a wind direction in the region of the putting green 9, a direction of grass growth and/or a green speed at the time of tee-off. These environmental parameters can preferably be determined with the help of measuring devices 11. The topographical parameter, which characterizes the topography, can for example be determined by means of a 3D scanner, for example a laser scanner, which is preferably integrated into the system 1 or is measured live by means of a time-of-flight sensor, in particular by means of image processing, e.g. a structure-from-motion process.

Preferably, the values of the topographical parameter are in the form of a 3D grid (3D mesh).

The environmental parameter, in particular the topographical parameter, can however also be obtained from databases based on e.g. satellite imagery. The wind speed and the weather conditions can be obtained from, for example, a weather station or weather database respectively. The green speed can be determined by, for example, a so-called stimpmeter or by other methods in which the ball is rolled up an incline from a defined height. Detecting the environmental parameters 105 can thus also be called the calibration phase of the system 1.

On the basis of the data available to the system 1 such as the topography of the putting green 9 and any further applicable environmental parameter there might be as well as the tee-off position 5 and the hole position 12, an ideal trajectory 15 of the golf ball 3 can be calculated 106 from the tee-off position 5 to the hole position 12 in the reference system 6. Alternatively or additionally, an ideal trajectory 14 of the club 2, or club head respectively, can also be determined 106 based on the data collected or on the ideal trajectory 15 of the ball 3, in which the ball 3 is struck such that it reaches the hole position 12 from the tee-off position 5 and ideally lands in the hole 12.

A first virtual trajectory model of the ball 3 and/or the club 2 is generated 108 on the basis of the ideal trajectory 14 of the golf club 2 and/or on the basis of the ideal trajectory 15 of the ball 3.

Calculating the ideal trajectory 14, 15 as well as generating the first virtual trajectory model is preferably performed by the processing unit 13.

Calculating the ideal trajectory 14, 15 in particular encompasses calculating individual points of the trajectory 14, 15 which, in the case of the golf ball 3, are contingent upon the topography and any further boundary conditions potentially applicable to the environmental parameters, and in the case of the club 2, the pivot point around which a movement of the club 2 is executed.

The ideal trajectory 15 of the ball 3 can be calculated by means of a mathematical model, in particular a differential equation, a rolling ball 3 on an inclined surface and numerical optimization methods.

The generating of a virtual trajectory model 108 preferably comprises producing a 3D model of the trajectory 14, 15; i.e., connecting the points in a line at a given specific width. The orientation of the line is further preferably adapted to the topography, e.g. in its cross slope. Further preferably, the generating comprises creating a representation of the ideal trajectory 14, 15 from a desired perspective, in particular the perspective of the display device 17 or user 7 respectively. This substantially corresponds to the procedural step of image synthesis or respectively a rendering, wherein an image or scene is produced from raw data.

This scene is preferably a virtual spatial model which defines objects and their material properties, light sources as well as the position and line of sight of an observer.

The virtual trajectory model is reproduced 109 in the display device 17, in particular via a graphics module of the processing unit 13. The virtual trajectory model is thereby displayed in the display device 17 as a first line, which can be dotted or solid, in superimposition with a visible section of the putting green 9 or the wider surroundings respectively.

Preferably, two different 3D grids of topography parameter values or two different topography parameters respectively are thereby used in calculating the trajectory and in generating a virtual trajectory model:

A 3D grid being provided to the system as a dataset and having been determined in a separate measurement of the environment's topography and exhibiting sufficient accuracy is in particular used to calculate the trajectory.

In contrast, a 3D grid which is for example optically determined by means of a tracking device can in particular be used to generate a virtual trajectory model. In particular, such a 3D grid determined by optical methods is preferably corrected with the assistance of a position measurement of individual points in the vicinity of the tracking module since there can sometimes be considerable deviations from the actual topography.

In one preferential embodiment, a first virtual chronological sequence of the position of the ball 3 or the club 2 on the ideal trajectory can be calculated prior to or respectively during the reproduction of the first virtual trajectory model 109. In the case of a golf ball 3, this chronological sequence thereby depends on the trajectory and substantially also on the tee-off position 5, the hole position 12 and the topography as well as any further applicable boundary conditions. In the case of the golf club 2, the chronological sequence of the position substantially depends on the pivot point about which the club 2 is swung and the momentum to be achieved at the tee-off position 5. The respective chronological sequence of the golf club 2 and/or golf ball 3 is correspondingly factored into the generating of the first trajectory model 107 and likewise reproduced 109 in the computerized glasses 17.

If the display device 17 is a pair of data glasses as described in the foregoing, the line for depicting a trajectory 14, 15 is then preferably superimposed in a see-through method over a section of the putting green 9 actually visible in reality. In this case, the line can thus only display when the field of view 19 of the data glasses 17 is also directed toward the actually visible section of the environment in reality.

In another preferential embodiment, which is likewise depicted in FIG. 1, the first virtual trajectory model can also be reproduced on a screen of a tablet computer 17. The line on the screen is thereby reproduced 109 with video data which shows the section of the putting green 9 and which the tablet computer itself filmed from its own perspective 102a.

The alternative of reproduction on a tablet computer 17 is in particular suited for a coach 32 who stands near a golfer 7 and likewise wants to observe the deviation of the struck ball 3 or the club motion from a respective ideal trajectory 14, 15.

As an alternative to filming 102a the field of view of a tablet computer 17, the detecting of a position and/or an orientation of the golf club 2 or a position of the ball 3 in the reference system, in particular during a period in which the club 2 or ball 3 is in motion, can also enable a second virtual trajectory model 111 to be generated of the club 2 or the ball 3 in the field of view 19 based on a respective actual trajectory 26, 27. This second virtual trajectory model can also be depicted 113 on the tablet computer 17 or also in the data glasses 17 in superimposition with the visible section of the environment. A chronological sequence can thereby also be additionally calculated 112 and displayed.

An ideal trajectory 15 of a ball 3, which can be reproduced in the data glasses 17 via the first trajectory model, is shown in FIG. 1 as a dashed curved line. Alternatively or additionally, the virtual trajectory model does not contain the course of the ideal trajectory 15 but rather the course of a theoretical trajectory 16 depicting the theoretical path of the ball 3 in flat topography when struck in the starting direction and with the force of momentum for the ideal trajectory 15. Based on the theoretical trajectory, the golfer 7 can estimate how forcefully and in which direction he would need to strike the ball if the putting green 9 had a flat topography.

If the actual trajectory 26, 27 is additionally virtually generated in the data glasses or on the tablet computer 17 respectively by means of the second virtual trajectory model, the golfer 7 or coach 32 is then no longer reliant on aligning the field of view 19 of the data glasses/tablet computer 17 to the one visible section of the putting green 9 in which the club 2 or the ball 3 is in motion. The golfer 7 and the coach 32 can now have the circumstances displayed from any given perspective. In principle, it is also preferably possible for the coach 32 to be shown the situation from the perspective of the golfer 7 without a second virtual trajectory model being generated.

In each embodiment of the invention, the actual club 2 and the actual ball 3, or their movement in real time respectively, can thereby be compared to the respective ideal trajectory 14, 15 and even to a virtual chronological sequence of a virtual club and virtual ball on the ideal trajectory 14, 15 as applicable. The two sequences are thereby synchronized via the point in time at which the ball 3 is struck. This being that moment when the club meets 2 the ball 3 or, in the case of ball sports without clubs, when a ball 3 loses contact with a user 7.

The chronological sequence in the first virtual trajectory model of the ideal trajectory 14, 15 or in the second virtual trajectory model of the actual trajectory 26, 27 can thereby in particular ensue by means of a schematic illustration of the respective piece of sports equipment, golf club 2 or golf ball 3.

FIG. 2 shows a second embodiment of the system 1 according to the third aspect of the invention. This second embodiment differs from the first embodiment substantially in that the absolute position and/or orientation of the data glasses or the tablet computer 17 respectively on the putting green 9 is not determined by an inside-out tracking method but rather by an outside-in tracking method. Markers 20b, 20c, 20d, 20e, 20f, 20g, 20h, 20i around the putting green 9 are no longer necessary in this embodiment.

To that end, the inventive system 1 comprises a direction finder 21 which detects a position and/or orientation of a pair of data glasses 17, for example, using a marker 20k attached to the data glasses 17. Preferably, a plurality of markers 20k are provided at different locations on the data glasses 17.

FIG. 4 shows a third embodiment of the system 1 according to the second aspect of the invention. This embodiment differs from the first and second embodiment substantially in that the position of the golf hole 12 and the display device, which in this case is a projector 8, are predetermined or respectively known and can be read into the system 202 from a database via a data interface 10. Alternatively, these positions can also be determined by a 3D scanner 11 preferably integrated into the tablet computer 17.

This embodiment is characterized by a first virtual trajectory model of the golf club 2 and/or the golf ball 3 being able to be generated 206 on the basis of detecting an environmental parameter 203, calculating an ideal trajectory 204 and, as applicable, a first virtual chronological sequence of a position of the club 2 and/or the ball 3 on the ideal trajectory 14, 15 and projecting 207 same directly onto the putting green 9 as the first line.

A user 7 can thus discern the ideal trajectory 15, or a theoretical trajectory 16 respectively, directly on the putting green 9.

Detecting a position and/or orientation of a pair of data glasses or a tablet computer 17 does not occur in this embodiment.

The tee-off position 5 is preferably detected 201, when not predefined by a user interface 4, in particular a touch-sensitive screen of a tablet computer, whereby the putting green 9 is displayed on the touch-sensitive screen 4 and the tee-off position 5 is likewise projected onto the putting green 9 by the projector 8 subject to the inputs made by the user 7 on the touch-sensitive screen 4.

The processing unit 13 in this embodiment is preferably a part of the user interface 4 or the projector 8.

The individual elements of the system 1 preferably communicate via wireless interfaces (not depicted).

FIG. 5 depicts both a field of view 19 of a display device 17, realized as a head-mounted display, in particular data glasses, as well as a field of view of a golfer 7.

The playing conditions shown thereby correspond to those of FIG. 1, whereby the golfer 7 is looking toward the two markers 20*i*, 20*b* at the edge of the putting green 9 and also sees the marker 20*a* in the hole 12, here in the form of a flag.

The golfer 7 has just hit the ball 3 and now sees the ideal trajectory 15 of the ball 3, the theoretical trajectory 16 of the ball 3, and the actual position of the ball 3 moving away from him in the field of view 19 through the data glasses 17.

In this way, the golfer 7 can determine the deviations of his struck ball 3 from the ideal trajectory 15 and correlate this simultaneous extrinsic feedback with his intrinsic feedback or perception respectively of his stroke.

As additional information, the golfer 7 can have the ideal chronological sequence of a golf ball display as an identification 29 of the position of a virtual golf ball on the ideal trajectory 15. This virtual golf ball 29 moves along the line of the ideal trajectory 15. The movement of the actual ball 3 and the virtual ball 29 is synchronized at the tee-off point; i.e. when the golf club 2 impacts the actual golf ball 3. The tee-off point can for example be determined by an optical process, an accelerometer (deceleration upon impact) on the golf club 2 or even calculated from the tee-off position 5 and the backswing motion of the golf club 2.

The additional information obtained can give the player 7 further simultaneous extrinsic feedback on the force with which he played the golf ball 3. Since the trajectory of the golf ball 3 is closely tied to its speed, only this further external visual feedback enables complete feedback between the information as to ideal stroke and the personal perception or intrinsic feedback of the player 7.

FIG. 6 shows a further depiction of a field of view 19 of a golfer 7, who in particular is wearing a head-mounted display 17, from a different perspective compared to FIG. 5. Before taking his swing, the golfer 7 is looking at his golf club 2 and the golf ball 3 situated in the tee-off position 5. Both the ideal trajectory 14 of the golf club 2 as well as the ideal trajectory 15 or theoretical trajectory 16 of the golf ball 3 are thereby displayed. The tips of the toes of the golfer 7 can be seen in the lower region of the field of view 19.

FIG. 7 shows a field of view 19, in particular through a head-mounted display 17, from a further perspective. The golfer 7 has not yet taken his stance. As depicted, the golfer 7 is thereby additionally shown a defined standing position 31, in the present case a line, as well as where applicable a further line perpendicular thereto in the visible section of the environment. Alternatively, the defined standing position 31 can also be depicted by displaying virtual feet.

FIG. 8 again shows the field of view 19 of a golfer 7 from the perspective of FIG. 6, wherein the line indicating the defined standing position 31 is further displayed. The golfer 7 positions his feet on same and takes aim with his golf club 2 prior to hitting the golf ball 3. The head-mounted display 17 or the projector 8 now also superimposes an arrow 25 for the player 7 which indicates which direction the golf ball 3 will roll/fly off when the golfer 7 takes his stroke. From this, the golfer 7 can realize that there is a deviation from the ideal trajectory 15 or respectively theoretical trajectory 16 as exactly superimposed at the beginning of the trajectory of the ball 3. The golfer 7 can then change the position of his golf club 2 accordingly.

FIG. 9 again shows the field of view 19 of a golfer 7 from the perspective of FIGS. 6 and 8. The golfer 7 has now taken his swing and executed the stroke. Thus, additionally to the ideal trajectory 14 of the golf club 2, the executed actual trajectory of the golf club 27 is also displayed as a progression during the swing as well as during the follow-through. The ideal trajectory of the club 14 continues on to the rear of the field of view 19 and the identification 30 shows the ideal position of the golf club 2 at the point in time shown in FIG. 9. The golf ball 3 has already left the range of the field of view 19 and is therefore no longer visible.

Here as well, the golfer 7 can have the ideal chronological sequence of a golf club displayed as an identification 30 of the position of a virtual golf club on the ideal trajectory 14 as additional information. Said virtual golf ball 29 moves along the line of the ideal trajectory 15. The movement of the virtual golf club 30 is thereby synchronized to the movement of the actual golf club 2 in respect of the golfer 7 beginning the backswing or in respect of the reversal point of the backswing (speed of the head of the golf club 2=0).

The communication between individual units of the system 1 can ensue wirelessly, e.g. via radio or optical signals. The information gained on the actual trajectories 27 of the golf club 2 and the actual trajectories 26 of the golf ball 3 can be evaluated using statistical methods, for example when a move, in particular a putt, is repeated multiple times at a single golf hole 12 from the same tee-off position 5 or a similar tee-off position 5 on a similar golf course.

If data on a professional golfer is available, the strokes executed by the golfer and the associated trajectories of the golf club 3 and golf ball 2 can also be compared to example trajectories of the professional golfer.

FIG. 10 shows one embodiment of a sequence of the method 100 according to the first aspect of the invention as described in the foregoing with respect to FIGS. 1 and 2 and 5 to 9. The order of the procedural steps can thereby be changed at will. In particular, all of the procedural steps can also be executed in parallel. As indicated by the arrows originating from the procedural steps of the reproduction 109, 113, the method is preferably repeated any number of times in order to create a continually updated visual augmented reality, in particular during the movement of the sports equipment 2, 3.

FIG. 11 shows one embodiment of a sequence of the method 200 according to the second aspect of the invention as described in the foregoing with respect to FIGS. 4 to 9. The order of the procedural steps can thereby be changed at will. In particular, all of the procedural steps can also be executed in parallel. As indicated by the arrows originating from the procedural steps of the reproduction 206, 210, also this method 200 is preferably repeated any number of times in order to create a continually updated visual augmented reality, in particular during the movement of the sports equipment 2, 3.

In a further embodiment of the method (200), the characteristics of at least one projector are additionally taken into account when generating the virtual trajectory model. At least individual procedural steps are thereby preferably implemented from the following:

- Detecting intrinsic projector parameters, e.g. a projection matrix, which transforms the three-dimensional objects onto a two-dimensional space such that the objects can be depicted correctly. Among that incorporated into this matrix are, albeit not limited to, allowances also made for the characteristics of the lens.
- Detecting extrinsic projector parameters, e.g. a position and orientation of the projector.
- Employing these projector parameters in depicting the virtual trajectory model in such a way as to correspond to an exact superimposition of reality.
- Identifying of the projector parameters which occurs either manually in advance (from the specifications of the at least one projector and/or by measuring and fine-tuning) or automatically (e.g. using a tracking module and/or using a calibration procedure, whereby characteristic representations (e.g. gray codes) are displayed by the projector and are detected by the tracking module, wherein the detection enables the projector parameters to be determined).

In a further embodiment of the method (100; 200), the system enables a type of augmented reality golf training in a "closed loop." The player is given individual feedback on his swings and the mechanical execution of his swings so that training and training progress are made measurable, trackable and more appealing. At least individual procedural steps are thereby preferably implemented from the following:

- Tracking, in particular continuously, the movements of a piece of sports equipment and the swings of a player with a tracking module.
- Storing the results of said tracking, in particular in a database.
- Analyzing, in particular continuously, the data so as to generate and evaluate characteristics of the player, as well as statistics and other attributes.

This evaluation can be presented to the player in the form of statistics (e.g. holed putts, miss patterns, swing characteristics) and/or incorporated into the display of a training method or an adapting of the virtual trajectory model in order to support the player in improving his game.

In particular, a comparison to professional players can be made using the collected data which can in turn be incorporated into the adaptation of the display. Furthermore, so-called leaderboards can also be created based on the statistics which enable the player to compare himself to other players and also enable making his training progress measurable.

In a further embodiment of the method (100; 200) and/or the system, a virtual 3D training environment is additionally displayed on the eyeglasses. The training environment shows the player information relevant to his training. Preferably, the training environment initially comprises a tracking of the player or piece of sports equipment. If 3D models of the player or professional players are available, they can be displayed, for example as "avatars", in order to depict the proper execution or deviations from the proper execution to the player. Preferably, a comparison can be made between the actual performance and/or motion sequence of the player and the ideal performance and/or motion sequence. Further preferably, the physics of the player can be linked to the 3D model so that the virtual player conducts himself exactly as would be ideal for a given stroke. In particular, the system provides the opportunity to position, play, pause, etc. the 3D model and thus renders a type of "3D video player".

In a further embodiment of the method (100; 200) and/or the system, a 3D measurement is made in real time and/or a continuous real-time identification made of environmental parameters. At least individual procedural steps are thereby preferably implemented from the following:

- Continuously scanning an environment by means of a scanning apparatus and/or a tracking module, in particular by a sensor, in particular by means of optical or other methods.
- Identifying and/or continuously improving at least one environmental parameter in a further step on the basis of the scan results; i.e., in particular adapting to the actual environment. Examples of such environmental parameters are the green speed, the so-called grain; i.e. the direction in which the grass grows, a topography or 3D grid respectively, wind direction, humidity level or parameters characterizing the current weather conditions.
- Feeding this information back into the algorithms and the display so that the system becomes a self-learning system.

Further embodiments of the method (100; 200) and/or system provide innovative interaction concepts, for example:

- The method or system enables the user to portray any desired visualizations directly in the environment. To that end, the user is provided with a tablet application as remote control for the system, via which he can make inputs.
- The positioning of the start position and target position ensues via intuitive input options such as following the player's line of vision or voice or touch commands.
- The system can be controlled by an interactive identification of the piece of sports equipment, in particular so as to make inputs and interact with the system.

Further embodiments of the method (100) and/or system take innovative approaches to determining position and/or orientation, for example:

- Simultaneous location and mapping: Specific landmarks as well as the current position and/or orientation of the projection device, in particular a head-mounted display, are collectively, in particular continuously, detected and identified. The system thereby enables an accurate display of virtual information in superimposition with specific points in the environment. In particular, this embodiment enables the number of markers to be reduced; at best, the use of markers can thereby be dispensed with altogether. At the same time, this embodiment provides the opportunity of identifying environmental parameters, in particular a topographical parameter, in real time.
- Simultaneous location and mapping concepts often exhibit discrepancies, which is why the described method and/or system make use of advanced approaches. A vector is thereby formed from a first perspective on which the virtual ball and the actual ball are arranged. The system thereby basically brings the virtual ball into alignment with the actual ball. When a second vector is formed from a second perspective, on which the virtual ball and the actual ball are arranged, the actual position of the ground can thus be concluded at this point from the intersection of the two vectors. Values of the topographical parameter can then be corrected accordingly, either locally or even globally throughout the entire reference system.

LIST OF REFERENCE NUMERALS 1 system
2 golf club
3 ball
4 user interface
5 start position
6 reference system
7 user
8 projector
9 environment, in particular playing field
10 data interface
11 scanning apparatus/measuring device
12 target position
13 processing unit
14 calculated, in particular ideal, club trajectory
15 calculated, in particular ideal, ball trajectory
16 theoretical trajectory
17 display device
18 tracking module
19 field of view
20a, 20b, 20c, 20d, 20e, 20f, 20g, 20h, 20i, 20k marker
21 direction finder
22 radiolocation device
23 accelerometer
24 gyrosensor
25 arrow
26 actual ball trajectory
27 actual club trajectory
28 camera
29 identification of ball position
30 identification of club position
31 standing position
32 coach

What is claimed is:

1. A system for analyzing the movement of at least one piece of sports equipment for a type of ball sport, comprising:
    a projector arranged to generate projections on at least one playing field;
    a data interface or scanning apparatus arranged to detect in a reference system a position of the projector, a defined start position and a target position for a ball of the type of ball sport, and at least one environmental parameter which comprises a topographical parameter that characterizes the topography and which at least partially characterizes an environment within an area between the start position and the target position;
    a processing unit arranged to utilize the reference system in calculating an ideal trajectory of the at least one piece of sports equipment based on the start position of the ball, the target position of the ball, and the at least one environmental parameter, and to generate a first virtual trajectory model, adapted to the topography based on the topographical parameter, of the at least one piece of sports equipment in at least one section of the environment on the basis of the calculated ideal trajectory of the at least one piece of sports equipment,
    wherein the processing unit is configured to operate the projector to project the start position of the ball and the first virtual trajectory model onto the playing field as a first line, and
    wherein the first line connects the start position and the target position and is adapted to a topography that is characterized by the topographical parameter.

2. The system for analyzing movement according to claim 1 further comprising:
    a user interface arranged to detect a start position of the ball of the type of ball sport in a reference system by means of input by a user.

3. The system according to claim 1, wherein the projector further comprises at least one accelerometer and one gyrosensor in order to measure movement in six degrees of freedom and wherein the processing unit is further arranged to determine, by means of coupling, an actual position and/or an actual orientation of the display device based on a position and/or an orientation of the display device determined by the tracking module.

4. The system of claim 1 further including a tracking module, arranged to detect a start position of a ball of the type of ball sport and a defined target position for the ball in a reference system and to detect a position and/or an orientation of the display device in the reference system.

5. The system according to claim 1, further including a tracking module that is arranged to determine an actual position of the piece of sports equipment and/or wherein the system further comprises a radiolocation device in order to determine the actual position and/or an actual trajectory of the piece of sports equipment, and wherein the display device is further arranged to display the actual position and/or the actual trajectory of the piece of sports equipment.

6. The system according to claim 5, wherein the system is additionally configured to display a deviation between the actual position and/or trajectory of the piece of sports equipment and the ideal position and/or trajectory of the piece of sports equipment.

7. The system of claim 1 wherein the projector projects the first virtual trajectory model onto the playing field in real time.

8. The system of claim 1, wherein the data interface or scanning apparatus is additionally arranged to detect a defined standing position of a player and the projector projects the defined standing position onto the playing field.

9. A system for analyzing the movement of at least one piece of sports equipment for a type of ball sport, comprising:
    a projector arranged to generate projections onto at least one environment;
    a data interface or scanning apparatus arranged to detect in a reference system a position and/or orientation of the projector, a defined start position and a target position for a ball of the type of ball sport, and at least one environmental parameter that comprises a topographical parameter, which characterizes the topography, and that at least partially characterizes an environment within an area between the start position and the target position; and
    a processing unit arranged to utilize the reference system in calculating an ideal trajectory of the at least one piece of sports equipment based on the start position of the ball, the target position of the ball, and the at least one environmental parameter in order to calculate a field of view of the projector in the reference system on the basis of the detected position and/or the orientation of the projector, and to generate a first virtual trajectory model, adapted to the topography based on the topographical parameter, of the at least one piece of sports equipment in at least one section of the environment on the basis of the calculated ideal trajectory of the at least one piece of sports equipment, wherein the processing unit is configured to operate the projector to project the start position of the ball and the first virtual trajectory model onto the environment as a first line, and wherein the first line begins at the start position and intersects the target position, the first line being adapted to a topography that is characterized by the topographical parameter.

* * * * *